(12) United States Patent
White

(10) Patent No.: US 8,035,504 B2
(45) Date of Patent: Oct. 11, 2011

(54) CHILD CARRIER LATCH WARNING SYSTEM

(76) Inventor: Julie White, Destin, FL (US)

( * ) Notice: Subject to any disclaimer, the term of this patent is extended or adjusted under 35 U.S.C. 154(b) by 339 days.

(21) Appl. No.: 12/387,613

(22) Filed: May 5, 2009

(65) Prior Publication Data

US 2010/0283596 A1 Nov. 11, 2010

(51) Int. Cl.
*B60Q 1/00* (2006.01)
*A47C 1/08* (2006.01)
*B60R 22/00* (2006.01)

(52) U.S. Cl. .................. 340/457.1; 340/457; 340/542; 340/667; 340/309.16; 297/250.1; 180/273; 701/45

(58) Field of Classification Search ............... 340/457.1, 340/457; 297/250.1
See application file for complete search history.

(56) References Cited

U.S. PATENT DOCUMENTS

| 5,581,234 | A | 12/1996 | Emery et al. |
| 7,339,463 | B2 * | 3/2008 | Donaldson .................... 340/457 |
| 7,391,310 | B2 * | 6/2008 | Ito et al. ..................... 340/457.1 |
| 2007/0229243 | A1 | 10/2007 | Welch |
| 2008/0073141 | A1 * | 3/2008 | Jaunarena-Ferrari ......... 180/268 |

* cited by examiner

*Primary Examiner* — Donnie Crosland
(74) *Attorney, Agent, or Firm* — Keaty Law Firm

(57) ABSTRACT

A child restraint warning system configured to be secured to a child seat/carrier having a base, a seat detachably connected to the base, where the child seat/carrier includes a harness configured to be releasably secured with a latch. When the seat is secured on the base a seat position sensor sends a signal to a control unit positioned on the back of the seat. The control unit is switched into an active status for detecting an unlocked condition of the harness latch. A first series of audible warning signals is produced by the control unit if the latch remains unlocked for a pre-determined period of time. If the latch continues to be in an unlocked condition after the first series of warning signals the control unit generates a second series of signals, which can be spoken messages pre-programmed by the user.

14 Claims, 1 Drawing Sheet

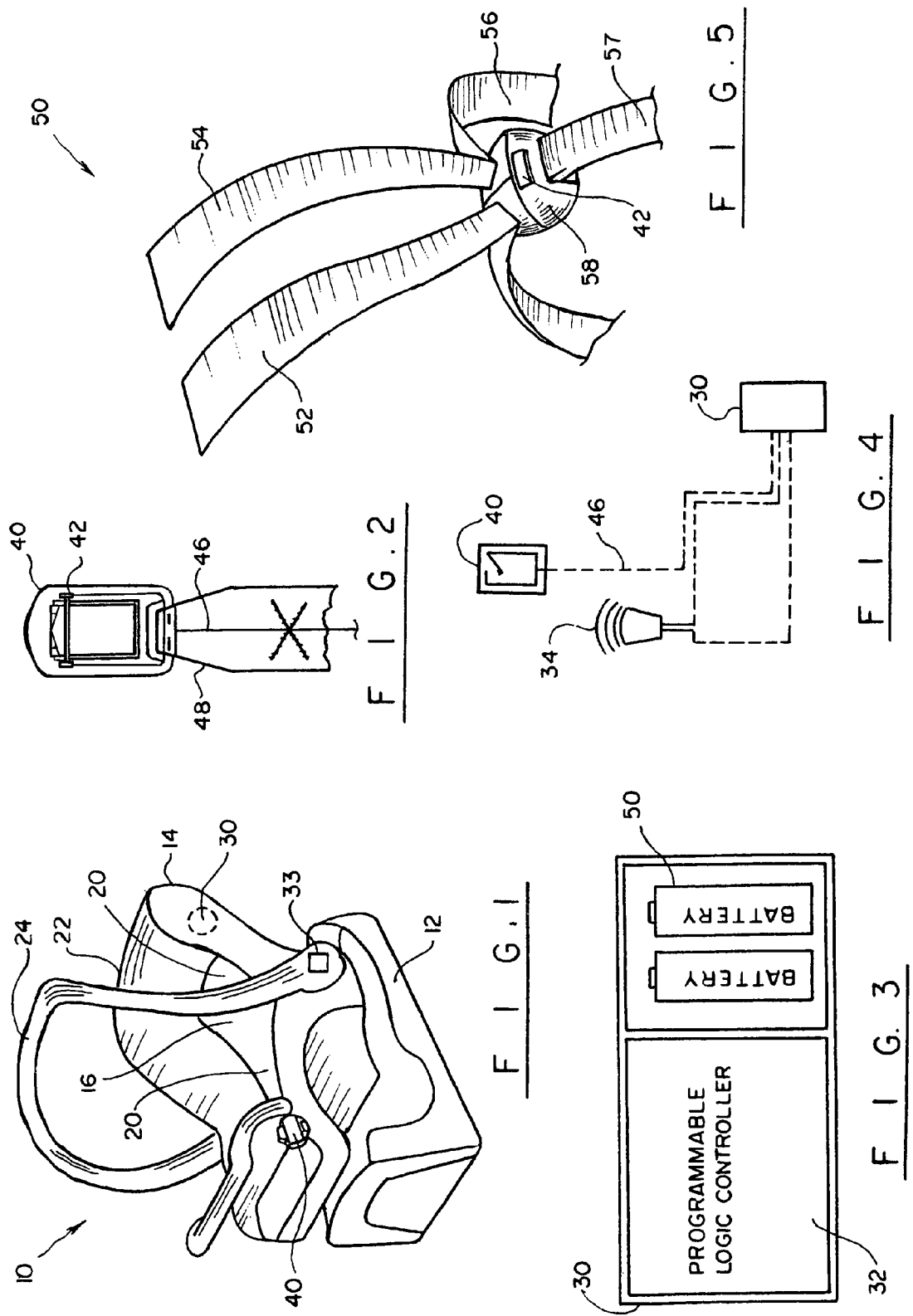

CHILD CARRIER LATCH WARNING SYSTEM

BACKGROUND OF THE INVENTION

The present invention relates to infant car seats and, more particularly, to a latch mechanism that connects the infant car seat to a base member in either a front-facing or a rear-facing orientation.

Every state in the U.S. has laws requiring that infants and small children be seated in car seats while riding in automobiles. Although the state laws differ in details they all take into consideration grim statistics: in 2001, there were 44.642 injuries from motor vehicle accidents for children three years old and younger, and that grows to 76,248 injuries for children four to eight years of age. Although injuries from motor vehicle accidents aren't tracked as to whether or not a child was riding in a car seat, it is likely that this increase in injuries for older children was because they are less likely to be in a proper child safety seat than a younger child.

To address this problem, the industry takes steps to continually improve child restraint systems, be it an infant car seat or a booster seat for older children. Some of the car seats double in function—they can also be used as infant carriers that larches onto a base installed in a car. The assembly can use a four- or five-point harness. When used as a car seat, the carrier is locked with the base; when used as an infant carrier it is removed from the base and can be carried by the provided handle or locked with a stroller. Such seat-carrier assemblies are usually designed for infants weighing up to 20 pounds.

While the car seat/carrier system is designed for ease of operation it becomes somewhat difficult to ascertain whether the carrier has been properly latched to the base. If the carrier is not latched and locked the seat may disengage from the base and fail in its function of protecting an infant. The present invention contemplates provision of a child restraint system that warns a child caregiver that the infant seat has not been properly latched with the base.

SUMMARY OF THE INVENTION

It is therefore an object of the present invention to provide a warning system for an infant sear/carrier.

It is another object of the present invention to provide a warning system designed to notify the user that the sear/carrier has not been latched.

It is a further object of the invention to provide a warning system that allows the user to readily differentiate the warning signal attributed to the seat/carrier latch condition.

These and other objects of the invention are achieved through a provision of a child restraint warning system configured to be secured to a child seat/carrier having a base, a seat detachably connected to the base, where the child seat/carrier includes a harness configured to be releasably secured with a latch. The warning system comprises a harness latch sensor mounted on the latch for detecting an unlocked position of the latch. A seat position sensor is mounted between the base and the child seat/carrier, the seat position sensor being adapted for detecting position of the child seat/carrier on the base and for generating a signal indicative of the child seat/carrier being installed on the base.

A control unit having a programmable logic controller is operationally connected to the harness latch sensor and the seat position sensor. The control unit is activated by a contact of the child seat/carrier with the base; it is adapted for generating an audible signals indicative of an unlocked position of the latch within a pre-determined period of time following activation of the control unit. If the latch remains in an unlocked position after a pre-determined period of time, the control unit can optionally generate a second series of audible signals, in the form of spoken messages, to warn the caregiver of the continued latch-unlocked condition.

BRIEF DESCRIPTION OF THE DRAWINGS

Reference will now be made to the drawings, wherein like parts are designated by like numerals, and wherein FIG. 1 is a perspective view of a child car-seat carrier assembly, with the warning system incorporated in the assembly.

FIG. 2 is a detail view illustrating a part of a latch with an electrical contact built into the latch.

FIG. 3 is a schematic diagram illustrating a control unit of the warning system of the present invention.

FIG. 4 us an electrical schematic of the warning system of the present invention.

FIG. 5 is a detail view showing the child seat/carrier harness system with a latch.

DETAIL DESCRIPTION OF THE INVENTION

Turning now to the drawings in more detail, the child seat/carrier assembly is generally designated by numeral 10. The assembly 10 comprises a base 12, which is adapted to be positioned on a car seat and secured thereto by an existing seat belt (not shown). A car seat/carrier 14 is fitted into the base 12 when the car/seat carrier 12 is used as a car seat for an infant. The carrier 14 forms a cradle 16 that id defined by a back portion 18 and a seat portion 20. The upper surface of the cradle 16 is adapted to receive padding with an infant therein, while the lower surface is adapted to be received and releasably supported on the upper surface of the base 12.

A wrap-around raised lip 22 follows the contours of the cradle 16 along the peripheral edge thereof to protect the child seated in the carrier 14. A handle 24 is pivotally secured to opposite sides of the raised lip 22 spanning above the cradle 16 to allow balancing of the seat 14 when the user carries the infant away from the base 12. A safety bar 26 is secured forward of the handle 24, spanning across the seat portion 20, while having opposite ends secured to the raised lip 22.

The child restraint system of the car seat/carrier includes a harness assembly 50 provided with a pair of shoulder straps 52, 54, a waist strap 56, and a leg strap 57. A latch 58 secures the straps of the harness assembly when a child is seated in the seat/carrier 10. A latch sensor 42 mounted on the latch 58 is operationally connected to other electrical components of the warning system.

The warning system of this invention provides an audible signal reminding the user to lock the latch on the straps securing the infant in the car seat. The warning system comprises a control unit 30, which houses a programmable logic controller 32 for operation of the warning system. The control unit 30 is mounted to the back portion 18 of the carrier 14. The control unit 30 is activated when the carrier 14 is engaged in the base 12. An electrical seat position sensor 33 is mounted between the base 12 and the carrier 14 for detecting an engaged position when the seat 14 is positioned on the base 12. The seat position sensor 33 operationally connected to the control unit 30.

When the carrier 14 is properly seated in the base 12 the seat position sensor 33 closes the circuit between the electrical contacts mounted on the base 12 and the carrier 14, thereby activating the control unit 30. Once the control unit 30 becomes activated it begins to sound an alarm or chime within a pre-determined period of time, for instance within 30 seconds. The beeps or chimes repeat at pre-determined intervals reminding the caregiver to latch the infant harness system. If the latch system is properly engaged within the initial interval programmed by the user, the warning signal will not be produced.

The warning system further comprises a speaker 34 built into the control unit 30. The audible signal can be supplemented with a brief audio message also reminding the caregiver to lock the latch on the harness of the infant car sear. The message can be short and delivered in either a female or male voice. The message may be programmed by the user using the control unit 30. The message may be for instance "Latch not closed," or "lock the harness," or a more elaborate one, depending on the user's preference.

The dual notification warning system further enhances the warning signal generated by the control unit 30. It should be noted that convention seat belt reminder usually sounds a serious of beeps or chimes reminding the car driver to secure a seat belt. The instant warning system allows the user to easily differentiate between the chimes of the seat belt reminder system and the child restraint system because it offers a double layer of protection—first the chimes and then a "spoken" message.

According to one aspect of the present invention, the latch 40 of the harness assembly is provided with an electrical sensor 42 and an electrical wiring 46 connects the electrical sensor 42 with the control unit 30. The wiring 46 is concealed in a conduit that is attached to a harness belt 48. If desired the conduit housing the wiring 46 can be stitched or otherwise secured to the flexible harness belt 48.

When the latch 40 is properly locked, the electrical sensor 42 closes the circuit between the control unit 30 and the latch 40, generating an electric signal that the latch 40 is secure. The control unit 30 then generates another signal in the form of an audio message confirming that the "latch is secure." Any type of message can be programmed by the user to be delivered through the speaker 34, confirming that the restraint system has been properly engaged. Alternatively, the controller 32 can be programmed to sound a long beep or a single chime indicating that the harness is properly secured.

The controller can be programmed to issue reminder messages at set intervals until such time as the user secures the harness in the car seat 14. The warning system is then set to idle. However, should the child unbuckle the latch 40 the warning system will be activated informing the parent that the buckle is not properly locked. In such a case, the caregiver can stop the car and re-attach the harness on the child. The use of the warning system makes it unnecessary for the caregiver to turn around while driving to ascertain whether the child is still properly restrained in the seat. The warning system is deactivated once the carrier 14 is removed from the base 12.

If desired, the control unit can be programmed to only generate "spoken" messages" signals from the beginning, upon the latch sensor detecting a latch-unlocked condition.

The latch 40 can be a part of a conventional four-point or five-point latch assembly conventionally used with car seats/carriers. The control unit 30 is provided with an independent power supply, for instance a battery pack 50. If the power in the battery pack becomes low, the controller 32 will cause the control unit to generate a series of audible signals indicating that the user needs to replace the batteries.

Use of the child restraint system may reduce parental anxiety and tension, as well as eliminate the need to turn around to check (while traveling) to see if the children are safely buckled in their seats. Ultimately, this device may save lives by allowing the safety harness to restrain the youngster in the event of an accident.

The warning system may be a stand alone component that is incorporated with the after-market child restraint system. Alternatively, the seat/carrier may be designed in a way that it is built into the new child restraint assembly. This system generally is not intergraded into the vehicle thus being portable, transferable from one car to another upon demand.

Many changes and modifications can be made in the system design of the present invention without departing from the spirit thereof. I therefore pray that my rights to the present invention be limited only by the scope of the appended claims.

I claim:

1. A warning system for a child car seat/carrier assembly having a base, a detachable carrier secured to the base and a harness assembly with a latch secured in the carrier, the warning system comprising:
    a controller unit secured on the carrier, said controller unit capable of generating audible signals;
    a seat position sensor at a point of contact between the base and the carrier, said seat position sensor being operationally connected to the controller unit and adapted for sending a signal to the controller unit when the carrier is positioned on the base for activation of the controller unit; and
    a latch sensor means mounted on the latch and operationally connected to the controller unit for transmitting a signal to the controller unit indicative of the latch being unlocked after a predetermined period of time of activation of the controller unit, and wherein the controller unit generates at least a first series of audible signals warning of an unlocked position of the latch.

2. The system of claim 1, wherein said controller unit is provided with a speaker means for generating a second series of signals in the form of audible messages warning of a continuous unlocked position of the latch after said at least the first series of audible signals has been produced for a pre-determined period of time.

3. The system of claim 2, wherein said controller unit is adapted for generating a user-programmable audible message.

4. The system of claim 1, wherein said controller unit is adapted for generating an audible signal warning of an unlocked position of the latch at any time during active status of the controller unit.

5. A child restraint warning system configured to be secured to a child seat/carrier having a base, a seat detachably connected to the base, where the child seat/carrier includes a harness configured to be releasably secured with a latch, the warning system comprising:
    a harness latch sensor means mounted on the latch for detecting an unlocked position of the latch;
    a seat position sensor mounted between the base and the child seat/carrier, said seat position sensor being adapted for detecting position of the child seat/carrier on the base and for generating a signal indicative of the child seat/carrier being installed on the base; and
    a control unit having a programmable logic controller operationally connected to the harness latch sensor and the seat position sensor, said control unit being activated by a contact of the child seat/carrier with the base, said control unit comprising a means for generating an audible signal indicative of an unlocked position of the latch within a pre-determined period of time following activation of the control unit.

6. The system of claim 5, wherein said means for generating an audible signal is adapted for producing a first series of audible signals and a second series of audible signals following the first set of audible signals after a pre-determined period of time when the latch remains in an unlocked position.

7. The system of claim 5, wherein said means for generating an audible signal is activated at any time when the latch is in an unlocked position while the control unit is in an active status.

8. The system of claim 5, wherein said means for generating an audible signal comprises a speaker.

9. The system of claim 5, wherein the first series of audible signals comprises a series of chimes.

10. The system of claim 5, wherein the second series of audible signals comprises a series of spoken messages.

11. A method of generating warnings for a child restraint system, the method comprising:

providing a child restraint system configured to be secured to a vehicle, the system comprising a base, a seat detachably positionable on the base and a harness assembly carried by the seat, said harness assembly having a lockable latch;

providing a latch sensor mounted on the latch, said sensor detecting a locked and an unlocked condition of the sensor;

providing a seat position sensor and mounting the seat position sensor between the base and the seat;

providing a control unit operationally connected to the latch sensor and to the seat position sensor;

generating a seat position signal indicative of the seat being installed on the base and transmitting the signal to the control unit, thereby activating the control unit;

detecting a latch-unlocked condition and generating, using the control unit, a first series of audible warning signals after a pre-determined period of time when the latch remains in the unlocked condition.

12. The method of claim 11, further comprising a step of detecting a continued latch-unlocked condition and generating a signal indicative of the continued latch-unlocked condition after the first series of audible signals did not result in the change of the latch-locked condition.

13. The method of claim 12, further comprising a step of generating, using the control unit, a second series of audible warning signals warning of the continued latch-unlocked condition.

14. The method of claim 13, wherein said second series of audible warning signals comprises spoken messages pre-programmed, using the control unit, by a user.

* * * * *